United States Patent [19]
Grant et al.

[11] Patent Number: 4,933,928
[45] Date of Patent: Jun. 12, 1990

[54] OPTICAL COMMUNICATIONS APPARATUS FOR SENDING OPTICAL TRANSMISSIONS TO A PLURALITY OF REMOTE STATIONS

[75] Inventors: Michael A. Grant; David Robson, both of Stevenage, England

[73] Assignee: British Aerospace Public Limited Company, London, United Kingdom

[21] Appl. No.: 187,269

[22] Filed: Apr. 28, 1988

[30] Foreign Application Priority Data

Apr. 28, 1987 [GB] United Kingdom ................. 8710038

[51] Int. Cl.$^5$ ............................................. H04B 9/00
[52] U.S. Cl. ....................................... 370/3; 455/606; 455/607; 455/617
[58] Field of Search ............... 455/600, 604, 606–608, 455/612, 617, 618, 619; 370/1, 3

[56] References Cited

U.S. PATENT DOCUMENTS 3,710,122  1/1973  Burcher ................................. 370/3
3,953,727  4/1976  D'Auria ................................. 370/3

OTHER PUBLICATIONS

Giannaris, "Shipboard Electro-Optic System Integration", Conference: Procedings of the Society of Photo-Optical Instrumentation Engineers, 4/18-21/77, pp. 120-125.

Auer, "Pointing, Acquisition and Tracking for Intersatellite Optical Data Links", pp. 131-137, Proc. ESA Workshop on Space Laser Application and Technology, Les Diablerets, Mar. 26-30, 1984 (ESA SP-202, May 1984).

Primary Examiner—Douglas W. Olms
Assistant Examiner—L. Van Beek
Attorney, Agent, or Firm—Cushman, Darby & Cushman

[57] ABSTRACT

Optical communications apparatus for sending and receiving optical transmissions to and from a plurality of remote stations by a plurality of independent terminals which are multiplexed so that all operate through a single optical system for both transmission and reception of modulated beams containing encoded data.

12 Claims, 2 Drawing Sheets

OPTICAL COMMUNICATIONS APPARATUS FOR SENDING OPTICAL TRANSMISSIONS TO A PLURALITY OF REMOTE STATIONS

This invention relates to optical communications terminal apparatus, and to a communication system using such apparatus, for linking a plurality of spacecraft.

According to one aspect of the invention, there is provided optical communications terminal apparatus for sending optical transmissions to a plurality of remote stations from a plurality of separate channels which are multiplexed to a single optical system. In addition the apparatus includes in each channel a respective receiver for demodulating optical beams received from the remote stations by the same optical system. The received beams are multiplexed to the correct channel for the respective receiver. All of the transmitted and received modulated beams have different wavelengths and the multiplexer contains wavelength discriminators for directing the respective beams correctly. Such terminal apparatus is particularly useful in aircraft, the terminal and spacecraft being configured for permitting, via the terminal, communication with two or more further spacecraft having like terminals mounted on board.

BRIEF DESCRIPTION OF THE DRAWINGS

For a better understanding of the invention reference will be made to the accompanying drawings which are given by way of example and in which.

DETAILED DESCRIPTION OF EXEMPLARY EMBODIMENTS

Figure 1:
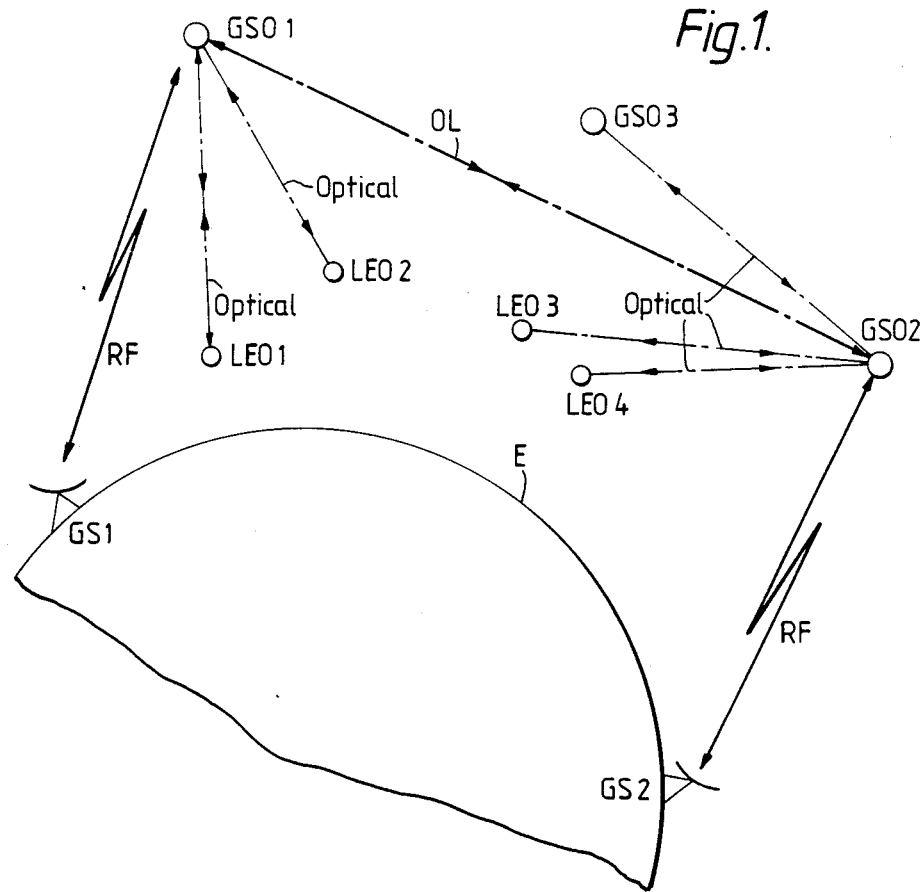
FIG. 1 is a diagrammatic view of the earth and a number of spacecraft in orbit around it.

As shown in FIG. 1, two RF ground stations GS1 and GS2 which are too far apart on the surface of the earth E to communicate via a single space station may nevertheless be linked by way of two such space stations GS01 and GS02 in geosynchronous orbit and in sight of each other and respective ones of the ground stations. The link between the two space stations could be via an intermediately positioned ground station (not shown) but, using the optical apparatus described below, the two space stations can communicate directly via an optical link OL and, in addition, each station can communicate via direct optical links with other geosynchronous stations, such as GS03, and/or several spacecraft in low earth orbit such as LE01-4.

Figure 2:
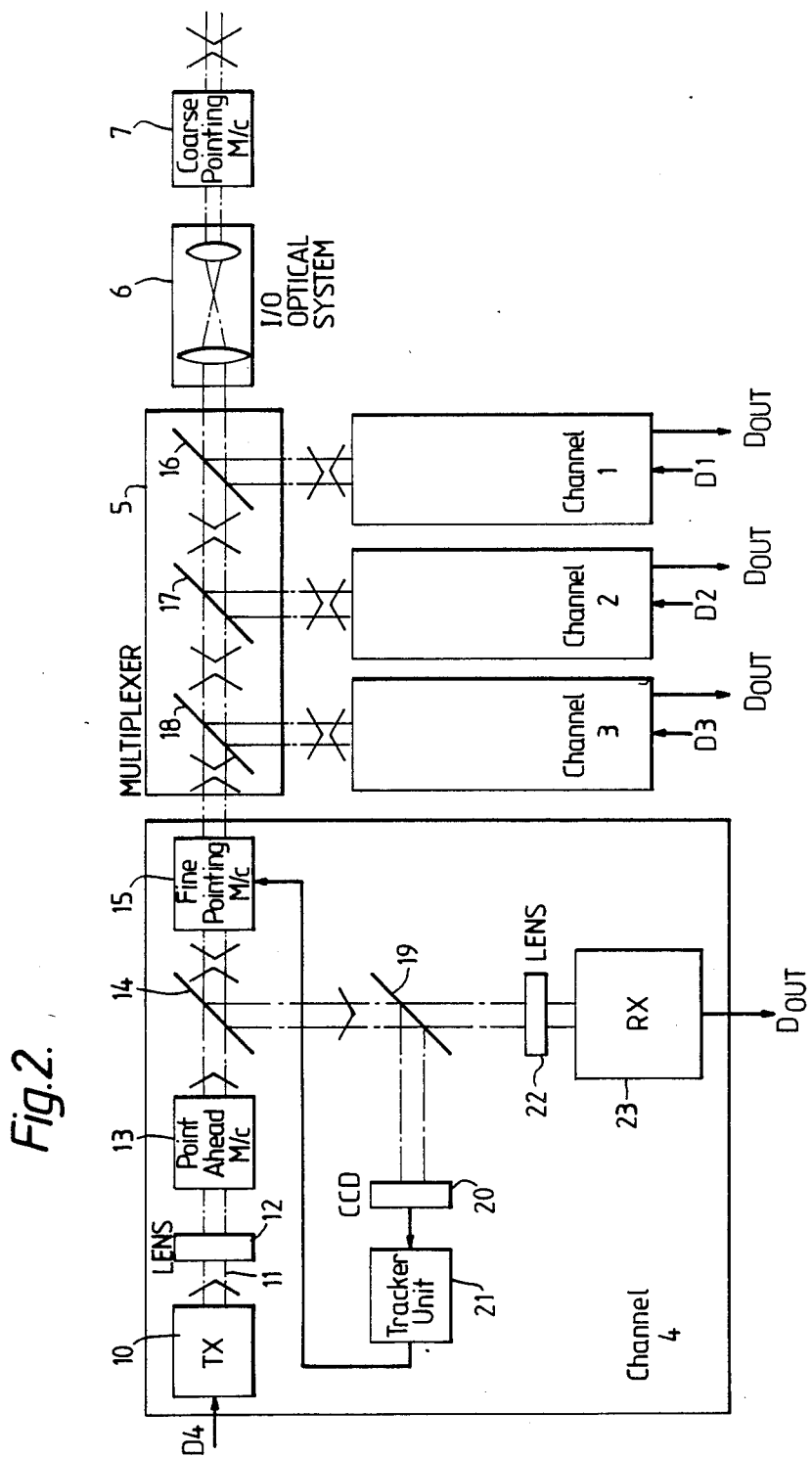
FIG. 2 is a simplified diagram of a communications terminal.

As shown in FIG. 2, the optical communication apparatus mounted on board each space station GS01 and GS02 comprises a series of channels (there are four in the illustrated apparatus, each of like construction, the content of only one of them, channel 4 being shown) a multiplexing arrangement 5, an input/output optical system 6 and a coarse pointing mechanism 7.

Each channel includes a transmitter subsystem 10 incorporating a semi-conductor laser source (not shown). Transmitter 10 of each channel receives the respective data signal D1 to D4 and produces an appropriate modulated beam 11 which is collimated and shaped as necessary by lens 12. From lens 12, the beam passes via a point ahead mechanism 13, an angled dichroic mirror 14 and a fine pointing mechanism 15 to the multiplexing arrangement 5. (The point ahead and fine pointing mechanisms 13 and 15 are explained below as is the coarse pointing mechanism 7.) Multiplexing arrangement 5 comprises three further dichroic mirrors 16, 17 and 18 which pass the beam from the fine pointing mechanism 15 along a straight optical path through to a first port of the optical system 6. These mirrors also receive the transmission beams from respective ones of channels 1 to 3 and reflect and direct them along the same path as the beam from channel 4 to the optical system 6 which transmits the beams out through its second port and hence to the coarse pointing mechanism 7.

The optical links of FIG. 1 are duplex links so, for each transmission beam sent out by the FIG. 2 apparatus, a return beam will be received by the coarse pointing mechanism 7 (assuming each link is actually in operation). These received return beams are of different wavelengths for each channel (as are the transmitted beams) as discussed below with reference to FIG. 3, and hence are split off into the appropriate channels by the dichroic mirrors 16, 17 and 18. Within each channel, the return beam passes via the fine pointing mechanism 15 to the dichroic mirror 14, where it is split from the the transmission beam and passed to a partially reflecting mirror 19. Here a portion of the return beam is tapped off to a charge-coupled imaging device 20 feeding a tracker sub-system 21 which in turn controls the fine pointing mechanism 15. The remainder of the return beam passes on to a lens 22 which focuses the beam onto a photodetector/receiver 23 which in turn detects/demodulates the received modulated beam of its encoded data and provides an electrical data output signal $D_{out}$.

The charge coupled imaging device 20 may include a light sensitive screen of pixels with its voltage for each line of pixels being clocked out line by line. Tracking unit 21 determines therefrom which pixels are illuminated, hence the angle of the incoming beam, and compares that with a nominal predetermined screen position. The difference is used to adjust the fine pointing mechanism 15 so that the illuminated pixels on the screen in device 20 returns to the nominal position to help maintain the transmitted beam aimed at the desired receiving station.

The receiver 23 comprises, for example, a detector, amplifying and equalization circuits, a demodulator and decoder and an interface circuit for transmitting the received data on to the spacecraft.

Figure 3:
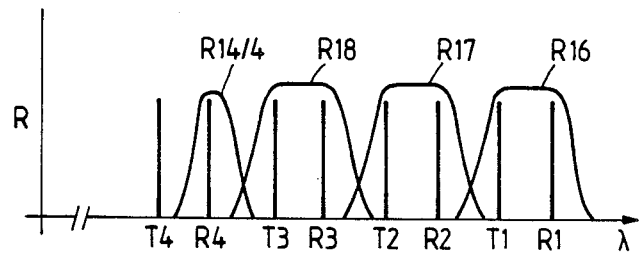
FIG. 3 is a diagram showing the flectance passbands of some dichroic mirrors used in the FIG. 2 terminal.

In order to be able to separate the channel beams and to separate the transmit and receive beams within each channel, the beams are all of different wavelengths, as shown in FIG. 3. Thus, the transmit and receive beams for channel 1 have respective wavelengths TI and RI, the beams for channel 2 have wavelengths T2 and R2, respectively, and so on. Within the series of wavelengths RI, TI, R2 . . . T4, wavelengths RI and TI are next adjacent to one another so that both are reflected by providing mirror 16 with a reflective bandwidth R16 as shown, i.e., containing both RI and TI but not any of R2 to T4. Similarly, wavelengths R2 and T2 are adjacent and are exclusively reflected by mirror 17 with bandwidth R1. Wavelengths R3 and T3 are also adjacent to one another and are exclusively reflected by mirror 18 with bandwidth R18.

Therefore, returned wavelengths R2, R3 and R4 pass through mirror 16 which reflects only received wavelength R1. Similarly, returned wavelengths R3 and R4 pass through mirror 17 which reflects only received wavelength R2, while mirror 18 reflects wavelength R3 and passes wavelength R4 on to channel 4.

As to transmitted wavelengths, mirrors 16, 17, 18 respectively reflect wavelengths T1, T2, T3 and respectively pass the wavelengths from the higher numbered channels.

Within channel 4, the transmit and receive beams are separated by mirror 14 which is provided with a reflectance bandwidth R14/4 centered on R4. In each other channel, the counterpart to mirror 14 has a reflectance bandwidth similar in shape to R14/4 but of course centered on R1, R2 or R3 as appropriate.

The function of the coarse pointing mechanism 7 is to position, as desired relative to the spacecraft, the overall field-of-view of the apparatus. By way of example, the mechanism 7 could comprise two servo-driven mirrors, one for each axis of movement of the field-of-view. As an alternative, however, the entire apparatus can be mounted on a gimbal mechanism so as to be movable about two axes relative to the spacecraft. The coarse pointing mechanism can be controlled in an open-loop manner, i.e., by computer calculation on board the spacecraft or by a telemetry link from the ground, all as is well known.

Meanwhile, the function of each fine pointing mechanism 15, again a pair of servo-controlled mirrors or some form of acousto-optical deflector, is to maintain each channel 'aimed' at the item, within the overall field-of-view. The channel is controlled by a closed loop system involving the imaging device 20 which receives a tapped-off portion of the return beam and then, via an appropriately designed control loop circuit and drive electronics within tracker unit 21, controls the pointing mechanism so that the return beam is properly received and hence also so that the transmit beam is properly aimed. Initially there would be an acquisition phase, say by providing a wide-angle beacon on one of the six spacecraft and arranging for the pointing mechanism on another spacecraft to scan across the expected beacon position until it is acquired and locked onto.

Because of the relatively large distances between the spacecraft and hence the finite time taken for light to travel between them and because the spacecraft may be moving relative to one another quite quickly, the transmit beam may have to be aimed, not in alignment with the receive beam, but rather at a position ahead of the other spacecraft in its direction of relative movement. This is the function of the point ahead mechanism 13 which again can comprise a servo-controlled two axis mirror deflector and which acts to deflect only the transmit beam. It is controlled in known manner, e.g., on an open-loop basis by calculation, using information from the tracker unit 21 and/or by previous mission analysis and then setting the mechanism 13 to give the appropriate point-ahead offset.

Use of multiplexer 5 with its wavelength discriminating dichroic mirrors 16, 17 and 18 allows the use of a single optical system to service multiple independent user terminals.

The function of the optical system 6 is to provide gain for each of the channels and to widen the field of view of the apparatus by decreasing the angles of deflection of the transmit beams effected by the fine pointing mechanisms 15. This system may take the form of a "fish-eye" lens (a wide field of view lens having magnification up to ×2 or 3), or of some alternative appropriate optical configuration, determined by the spacecraft mission requirements. For example, it can comprise what might be called a "minifying" telescope (i.e., looking through a telescope backwards) having lens arranged to reduce the waist size of the transmit beams as shown in FIG. 2.

Examples of appropriate structures for the coarse printing, point ahead and fine pointing mechanisms 7, 13 and 15 are described in the article "Pointing, Acquisition and Tracking for Intersatellite Optical Data Links" by W. Auer in the Proc. ESA Workshop on Space Laser Applications and Technology, Les Diablerets, 26-30 Mar. 1984 (ESA SP-202, May 1984) pages 131-137, the content of which is incorporated herein by reference.

FIG. 4 of that Auer article shows one example of a coarse pointing mechanism in which two mirrors are rotated around orthogonal axes to provide a hemispherical field of view for the system. An alternative technique used where the output mirrors might be very large, shown in FIG. 3 illustrates how the whole system can be gimballed to provide a hemispherical field of view. Such a degree of movement is most likely to be required only in low earth orbit. In geostationary orbit, the earth substends an angle of 17°. Hence, for communications from GEO to LEO, a field of view of 20° should suffice.

FIG. 5 of that Auer article shows one half of the fine pointing/point ahead mechanisms. For each of these mechanisms, two such mirrors would be mounted such that they again are rotated around orthogonal axes to provide two axis positioning.

The invention is further defined by the appended claims the scope of which includes the embodiments described above and equivalents including those variations which are obvious to one of ordinary skill in this art.

What is claimed is:

1. Optical communications apparatus for sending optical transmissions to a plurality of remote stations, comprising:
   a plurality of channel means each having respective optical transmitting means for outputting respective modulated optical beams of encoded data to be transmitted to said stations,
   an optical system having at least a first port and a second port and means for receiving optical beams at one of said first and second ports and transmitting them on to the other of said first and second ports with gain,
   optical multiplexing means coupled between said optical system and each of said plurality of channel means for receiving the respective modulated beams for each of said respective transmitting means of each of said plurality of channel means and for multiplexing said beams to direct a multiplexed beam to said first port for transmission by the optical system to said second port, and
   pointing means, coupled to said multiplexing means, for directing said modulated beams in a predetermined manner relative to said remote stations.

2. Apparatus as in claim 1, wherein the modulated optical beams have different wavelengths and said multiplexing means has an optical path coupled at one end to said first port and at its other end to each of said channel means for receiving each modulated beam from the respective transmitting means of each respective channel means, including respective wavelength discriminating means along said path for receiving the modulated beams from the other of said respective transmitting means and directing all of the plurality of modulated beams along said path to said first port of the optical system.

3. Apparatus as in claim 2 wherein each of said wavelength discriminating means is a respective dichroic mirror located on said optical path and having a respective bandwidth corresponding to the wavelength of the modulated beam of its respective transmitting means so that wavelengths of the other modulated beams which are outside said respective bandwidth pass through the mirror.

4. Apparatus as in claim 1 wherein said pointing means includes a coarse pointing means coupled to the second port of the optical system and operable to determine the overall field of view of the apparatus.

5. Apparatus as in claim 1 wherein said pointing means includes point ahead means for controlling the direction of a beam transmitted through said multiplexer and through said optical system with a predetermined lead angle relative to a moving remote station.

6. Optical communications apparatus for sending optical transmissions to a plurality of remote stations, comprising:
a plurality of channel means each having respective optical transmitting means for outputting respective modulated optical beams of encoded data to be transmitted to said stations,
an optical system having at least a first port and a second port and means for receiving optical beams at one of said first and second ports and transmitting them on to the other of said first and second ports with gain;
optical multiplexing means coupled between said optical system and each of said channel means for receiving the respective modulated beams for said respective transmitting means and for directing each such beam to said first ports for transmission by the optical system to said second port, and
pointing means, coupled to said multiplexing means, for directing said modulated beams in a predetermined manner relative to said remote stations,
wherein said pointing means includes point ahead means for controlling the direction of a beam transmitted through said multiplexer and through said optical system with a predetermined lead angle relative to a moving remote station and includes fine pointing means coupled to said multiplexer and operable to maintain a transmitted beam aimed at a predetermined remote station.

7. Optical communications apparatus for sending and receiving transmissions to and from a plurality of remote stations, comprising:
a plurality of channel means each having respective optical transmitting means for outputting respective modulated beams of encoded data to be transmitted to said plurality of remote stations and having respective optical receiving means for demodulating respective modulated beams of encoded data received from said stations,
an optical system means having first and second ports for receiving optical beams at either port and transmitting them on to the other port with gain,
said second port being coupled to receive said modulated beams from a plurality of remote stations,
optical multiplexing means coupled to said first port and to each of said respective transmitting means for multiplexing the transmitted modulated beams to produce a multiplexed signal and demodulating the received modulated beams, and
pointing means, coupled to said optical multiplexing means for determining a field of view and direction for each channel in a predetermined manner relative to said remote stations.

8. Apparatus as in claim 7 wherein the modulated optical beams to be transmitted and received have different wavelengths and said multiplexing means has an optical path coupled at one end to said first port and at its other end to each of said channel means for receiving the modulated beam from the respective transmitting means of each respective channel means or for transmitting to that one channel means a modulated beam received via said first port from a remote station, there being respective wavelength discriminating means along said path for directing all of the plurality of transmitted and received modulated beams along said path between said first port of the optical system and the respective channel means.

9. Apparatus as in claim 8 wherein each of said wavelength discriminating means is a respective dichroic mirror located on said optical path and having a reflective bandwidth embracing the wavelengths of the modulated beams of the transmitting and receiving means of its respective channel means so that wavelengths of the other transmitted and received modulated beams which are outside said reflective bandwidth pass through the mirror.

10. Apparatus as in claim 7 wherein said pointing means includes a coarse pointing means coupled to the second port of the optical system and operable to determine the overall field of view of the apparatus.

11. Apparatus as in claim 7 wherein said pointing means includes point ahead means for controlling the direction of a beam transmitted through said multiplexer and through said optical system with a predetermined lead angle relative to a moving remote station.

12. Optical communications apparatus for sending and receiving transmissions to and from a plurality of remote stations, comprising:
a plurality of channel means each having respective optical transmitting means for outputting respective modulated beams of encoded data to be transmitted to said plurality of remote stations and having respective optical receiving means for demodulating respective modulated beams of encoded data received from said stations,
an optical system means having first and second ports for receiving optical beams at either port and transmitting them on to the other port with gain,
said second port being coupled to receive said modulated beams from a plurality of remote stations,
optical multiplexing means coupled to said first port and to each of said respective transmitting means for multiplexing the transmitted modulated beams to produce a multiplexed signal and demodulating the received modulated beams, and
pointing means, coupled to said optical multiplexing means for determining a field of view and direction for each channel in a predetermined manner relative to said remote stations,
wherein said pointing means includes point ahead means for controlling the direction of a beam transmitted through said multiplexer and through said optical system with a predetermined lead angle relative to a moving remote station and includes fine pointing means coupled to said multiplexer and operable to maintain a transmitted beam aimed at a predetermined remote station.

* * * * *